Jan. 26, 1971 J. W. LUNDEN ET AL 3,559,091

BROADBAND INTERSTAGE COUPLING CIRCUIT

Filed Jan. 4, 1968

INVENTORS:
JOHN W. LUNDEN,
JAMES V. O'HERN,

BY Marvin L. Goldenberg
THEIR ATTORNEY.

United States Patent Office 3,559,091

Patented Jan. 26, 1971

3,559,091

BROADBAND INTERSTAGE COUPLING CIRCUIT

John W. Lunden, Camillus, and James V. O'Hern, Nedrow, N.Y., assignors to General Electric Company, a corporation of New York Filed Jan. 4, 1968, Ser. No. 695,761
Int. Cl. H03f *1/42, 1/00*
U.S. Cl. 330—165 2 Claims

ABSTRACT OF THE DISCLOSURE

A broadband interstage circuit for coupling two stages of amplification in the VHF and UHF region, wherein an impedance match is provided over a frequency band on the order of several hundred mHz. The circuit is composed of a transmission line transformer having a capacitor connected between one of the transformer terminals and ground. The circuit, being essentially non-dissipative, is appropriate for use with large signals and high power levels, up to many tens of watts.

BACKGROUND OF THE INVENTION

(1) Field of the invention

The invention relates generally to the field of interstage coupling networks for coupling together points in a circuit having different impedances and, more specifically, which provide an impedance match between cascaded amplifier stages over a broad band of frequencies.

(2) Description of the prior art

Interstage coupling devices known to the art which provide effective impedance matching between cascaded amplifier stages normally have bandwidth limitations and exhibit a relatively high Q. Typical structures are signal and double tuned band pass filters and/or low pass filter and matching sections, e.g., T, $\pi$ and L sections, singly or in combination. In addition to being narrow band, the structures are readily subject to spurious responses and instabilities. Attempts to realize wideband amplifier operation have resulted either in a compromise of the impedance matching function or in the need to employ relatively complex circuitry, such as distributed amplifiers or stagger tuned amplifiers.

Transmission line transformers, which are broadband structures, per se, are known to provide broadband operation for numerous coupling applications. However, when employed as the interstage between transistor amplifiers broadband operation is not achieved because of the reactive nature of the amplifier input and output impedances.

SUMMARY OF THE INVENTION

It is a principal object of the invention to provide a novel interstage coupling network for providing an impedance match between two points in a circuit of different reactive impedances, which network performs well over an exceedingly broad band of operating frequencies.

It is a further object of the invention to provide a novel interstage coupling network exhibiting broadband operation for coupling together a pair of cascaded transistor amplifier stages.

It is another object of the invention to provide a novel interstage coupling network as described that exhibits a broadband operation at VHF and into the UHF region.

It is still another object of the invention to provide an interstage coupling network of the type described which is essentially non-dissipative and can handle relatively large signals.

It is another object of the invention to provide an interstage coupling network as above described which is of a relatively simple configuration and may be economically fabricated.

These and other objects of the invention are accomplished by a circuit which includes a transmission line transformer composed of a four terminal twisted wire pair wound about a ferrite toroid. One terminal of the wire pair is coupled to the output of a first transistor amplifier stage, exhibiting a first impedance having both a real and a reactive component. A pair of terminals of said wire pair are joined at the output side and coupled to the input of a succeeding transistor amplifier stage exhibiting a second impedance also having both a real and a reactive component. The remaining terminal is coupled through a capacitor to ground. The capacitor is readily adjusted so as to provide an impedance transformation of the input circuit which matches that of the output circuit and is maintained over a wide band of frequencies. The coupling circuit has been found to exhibit a Q having a value of less than unity which provides operation from hundreds of kHz. to the UHF region with a bandwidth of several hundred mHz.

BRIEF DESCRIPTION OF THE DRAWING

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

DESCRIPTION OF THE PREFERRED EMBODIMENT

Figure 1:
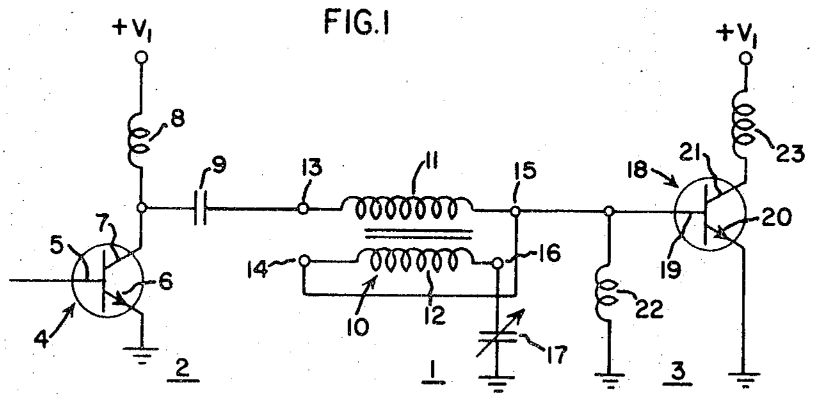
FIG. 1 is a schematic circuit diagram of an interstage coupling network for a pair of transistor amplifier stages, in accordance with the invention.

With reference to FIG. 1, there is illustrated an interstage coupling network 1 which couples a first transistor amplifier stage 2 to a cascaded transistor amplifier stage 3 providing an impedance match bewteen said stages over an extremely broadband of frequencies. Amplifier stage 2 includes a NPN transistor 4 having a base 5 to which an input is applied, an emitter 6 connected directly to ground and a collector 7 connected through a choke coil 8 to a D.C. voltage source $+V_1$. The collector 7 is further connected through a coupling capacitor 9 to a transmission line transformer 10. Transformer 10 includes a pair of wires 11 and 12 closely twisted about one another so as to compensate for interwinding parasitic capacitances, the twisted wire pair preferably being wound with several turns about a ferrite core for increasing their inductance. The wire pair act as a two wire transmission line having a first pair of terminals 13 and 14 on the input side and a second pair of terminals 15 and 16 on the output side. Terminal 13 is connected to collector 7 of input amplifier stage 2; terminal 16 is connected through an adjustable capacitor 17 to ground; and terminal 15, which in the actual structure is joined to terminal 14 at a single point, is connected to output amplifier stage 3.

Amplifier stage 3 includes NPN transistor 18 having base 19, emitter 20 and collector 21. Base 19 is connected to terminal 15 and through a choke coil 22 is connected to ground. Emitter 20 is connected directly to ground and collector 21 is connected through choke coil 23 to source $+V_1$.

One exemplary embodiment of the circuit of FIG. 1 includes the following parameters:

Choke coils 8, 22 and 23: approximately 500 nanohenries
Coupling capacitor 9: .0047 microfarad Capacitor 17: adjustable between 5.5 to 15 picofarads Transformer 10: unbalanced, unsymmetrical, distributed transformer; 4:1 impedance ratio, five turns No. 29 Formvar wire twisted together and wound on GE S–27 core; $Z_o$50–70 ohms Transistors 4 and 18: Type 2N3866

The parasitic collector to ground capacitance of the transistor 4, which is the principal reactive component of the first amplifier stage, has a value on the order of 3 to 15 picofarads. The parastic inductance of the base emitter circuit of transistor 18, the principal reactive component of the second amplifier stage, has a value on the order of 50 nanohenries.

These parasitics are readily compensated for by adjustment of the capacitor 17, the coupling circuit providing a flat response within 3 db over a bandwidth of 100 to 200 mHz.

Figure 2:
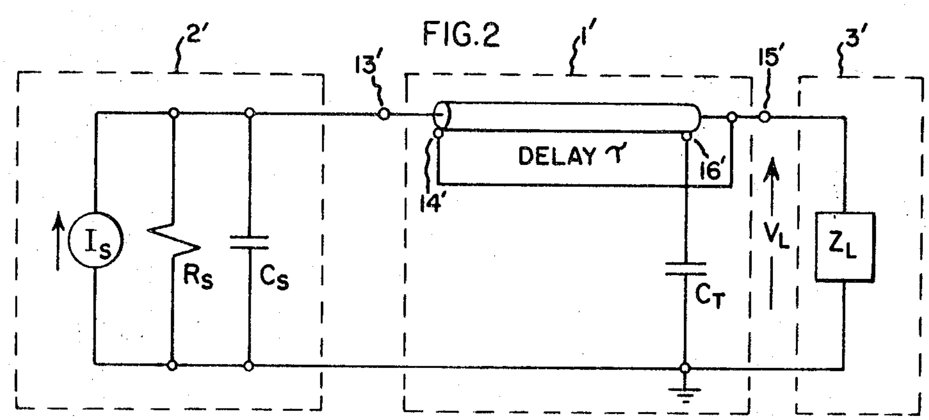
FIG. 2 is an equivalent circuit of that shown in FIG. 1.

The operation of the circuit may be best analyzed by referring to the equivalent circuit diagram of FIG. 2 wherein the same reference characters with added prime notations are employed for components corresponding to those of FIG. 1. Input amplifier stage 2' is shown as including a current source $I_s$ having a source resistance $R_s$ and a source capacitance $C_s$ connected in shunt therewith. The capacitance $C_s$ corresponds to the parasitic collector capacitance of transistor 4 in FIG. 1. Source 2' is shown directly connected to transmission line transformer 1' at terminal 13'. Transformer 1 is illustrated as a coax delay line of delay $\tau$. Terminal 15' at the output side of the inner conductor is directly connected to terminal 14' on the input side of the outer conductor, which connection provides the requisite impedance transformation. The outer conductor at the output side is connected from terminal 16' through capacitor $C_T$ to ground, capacitor $C_T$ corresponding to capacitor 17 in FIG. 1. The output amplifier stage 3' is shown merely as an impedance $Z_L$, which is connected between terminal 15' and ground.

The transfer admittance G of the circuit of FIG. 2, which is the ratio of the voltage $V_L$ across $Z_L$ to the current $I_S$, may be expressed as $$G=\left(\frac{2}{R_s}+\frac{C_s}{2C_TZ_L}+\frac{1}{2Z_L}\right)-j\left(\frac{1}{2\omega C_TZ_LR_s}-2\omega C_s\right) \quad (1)$$

The Q for the circuit is derived from the transfer admittance G, and is given by the expression:

$$Q=\frac{1}{\frac{2}{R_s}+\frac{C_s}{2C_TZ_L}+\frac{1}{2Z_L}}\div\frac{1}{2\omega C_s-\frac{1}{2\omega C_TZ_LR_s}} \quad (2)$$

Equations 1 and 2 are somewhat simplified, being valid for a delay $\tau$ of zero. However, since the delay will be small, they are suitable for the present purpose of demonstrating that a wideband operation is available. Accordingly, from the expression (2) it is immediately obvious that by the proper selection of components, the denominator of the second, reactive term may be made to approach zero and Q therefore made extremly small. It can also be mathematically derived from the expression (2) that values of Q less than 1 are obtainable over a frequency range of several hundred mHz.

The appended claims are intended to include within their meaning all changes and modifications to the specific disclosure made herein that may reasonably be said to be within the true scope of the invention.

What we claim as new and desire to secure by Letters Patent of the United States is:

1. A broadband circuit comprising:

(a) an input stage exhibiting a first impedance having a reactive component and an output stage exhibiting a second impedance having a reactive component, (b) a transmission line transformer for coupling together said stages, said transformer including first and second electromagnetically coupled conductors each having an input terminal and an output terminal, said conductors connected as a two wire transmission line with the input terminals of said conductors being at the input end of said transmission line and the output terminals of said conductors being at the output end of said transmission line, the output terminal of said first conductor directly connected to the input terminal of said second conductor.

(c) means for further connecting the output terminal of said first conductor to the input of said output stage, (d) means for connecting the input terminal of said first conductor to the output of said input stage, and (e) means for connecting a variable capacitor between the output terminal of said second conductor and a common point in the circuit, whereby said capacitor can be adjusted to compensate for the reactive components of said first and second impedances and thereby provide an impedance match over a broad band of frequencies.

2. A broadband amplifier circuit as in claim 1 wherein said electromagnetically coupled conductors are closely wound several times about one another and said input and output stages are, respectively, first and second amplifier stages which each include transistor amplifiers, the collector electrode of the first transistor amplifier providing the output from said first amplifier stage and the base electrode of the second transistor amplifier receiving the input to said second amplifier stage.

References Cited

UNITED STATES PATENTS

| | | | |
|---|---|---|---|
| 3,426,288 | 2/1969 | Ulmer | 330—167X |
| 3,461,394 | 8/1969 | Giorgetti | 330—167X |
| 1,792,274 | 2/1931 | Carlson et al. | 330—166 |
| 3,396,341 | 8/1968 | Von Fonge | 330—166X |

FOREIGN PATENTS

| | | | |
|---|---|---|---|
| 38,743 | 4/1928 | Demark | 330—166 |

NATHAN KAUFMAN, Primary Examiner

U.S. Cl. X.R.

330—21